(12) United States Patent
Stein et al.

(10) Patent No.: US 9,223,013 B2
(45) Date of Patent: *Dec. 29, 2015

(54) ESTIMATING DISTANCE TO AN OBJECT USING A SEQUENCE OF IMAGES RECORDED BY A MONOCULAR CAMERA

(75) Inventors: Gideon P. Stein, Jerusalem (IL); Andras D. Ferencz, Jerusalem (IL); Ofer Avni, Modiin (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 790 days.

This patent is subject to a terminal disclaimer.

(21) Appl. No.: 13/453,516

(22) Filed: Apr. 23, 2012

(65) Prior Publication Data
US 2012/0200707 A1 Aug. 9, 2012

Related U.S. Application Data

(63) Continuation of application No. 11/554,048, filed on Oct. 30, 2006, now Pat. No. 8,164,628.

(60) Provisional application No. 60/755,778, filed on Jan. 4, 2006.

(51) Int. Cl.
*H04N 7/18* (2006.01)
*G01S 11/12* (2006.01)
*G01C 3/22* (2006.01)
(Continued)

(52) U.S. Cl.
CPC . *G01S 11/12* (2013.01); *G01C 3/22* (2013.01); *G01S 17/93* (2013.01); *G06K 9/00805* (2013.01); *B60R 11/04* (2013.01);
(Continued)

(58) Field of Classification Search
CPC ..... G01S 17/93; G01S 11/12; G06K 9/00805; G01C 22/00; G01C 3/00; B60R 11/04; G01B 11/026
USPC ............ 348/148, 42, 135, 139; 701/205, 301; 382/104, 106, 103, 154; 250/208.1; 327/558
See application file for complete search history.

(56) References Cited

U.S. PATENT DOCUMENTS

| 4,257,703 A | 3/1981 | Goodrich |
| 4,931,937 A | 6/1990 | Kakinami et al. |

(Continued)

FOREIGN PATENT DOCUMENTS

| EP | 0465375 A2 | 1/1992 |
| EP | 1806595 B1 | 4/2009 |

OTHER PUBLICATIONS

European Search Report issued in corresponding European application No. EP06124013.1, Apr. 11, 2007.
(Continued)

*Primary Examiner* — Jungwon Chang
(74) *Attorney, Agent, or Firm* — The Law Office of Michael E. Kondoudis

(57) ABSTRACT

A method for monitoring headway to an object performable in a computerized system including a camera mounted in a moving vehicle. The camera acquires in real time multiple image frames including respectively multiple images of the object within a field of view of the camera. An edge is detected in the images of the object. A smoothed measurement is performed of a dimension the edge. Range to the object is calculated in real time, based on the smoothed measurement.

18 Claims, 7 Drawing Sheets

(51) Int. Cl.
*G01S 17/93* (2006.01)
*G06K 9/00* (2006.01)
*G01C 22/00* (2006.01)
*G01B 11/02* (2006.01)
*G01C 3/00* (2006.01)
*B60R 11/04* (2006.01)

(52) U.S. Cl.
CPC ............... *G01B 11/026* (2013.01); *G01C 3/00* (2013.01); *G01C 22/00* (2013.01)

(56) References Cited

U.S. PATENT DOCUMENTS

| | | |
|---|---|---|
| 5,159,557 A | 10/1992 | Ogawa |
| 5,515,448 A | 5/1996 | Nishitani |
| 5,867,256 A | 2/1999 | Van Rheeden |
| 6,765,480 B2 | 7/2004 | Tseng |
| 6,810,330 B2 | 10/2004 | Matsuura |
| 6,873,912 B2 | 3/2005 | Shimomura |
| 6,903,680 B2 | 6/2005 | Samukawa et al. |
| 6,930,593 B2 | 8/2005 | Crawshaw |
| 8,164,628 B2* | 4/2012 | Stein et al. ................ 348/148 |
| 2003/0040864 A1 | 2/2003 | Stein |
| 2004/0016870 A1* | 1/2004 | Pawlicki et al. ........... 250/208.1 |
| 2004/0057601 A1* | 3/2004 | Honda ....................... 382/104 |
| 2005/0002558 A1* | 1/2005 | Franke et al. .............. 382/154 |
| 2005/0232463 A1 | 10/2005 | Hirvonen et al. |
| 2005/0237385 A1* | 10/2005 | Kosaka et al. ............. 348/42 |
| 2006/0104481 A1 | 5/2006 | Demro et al. |
| 2006/0177097 A1* | 8/2006 | Fujimura et al. ........... 382/103 |
| 2006/0212215 A1* | 9/2006 | Koulinitch ................. 701/205 |
| 2007/0127779 A1* | 6/2007 | Miyahara ................... 382/106 |
| 2007/0268067 A1* | 11/2007 | Bernhard et al. ........... 327/558 |
| 2008/0069399 A1 | 3/2008 | Nagao et al. |

OTHER PUBLICATIONS

European Search Opinion issued in corresponding European application No. EP06124013.1, Apr. 11, 2007.

"Vision-based ACC with a Single Camera: Bounds on Range and Range Rate Accuracy", Gideon P. Stein, IEEE Intelligent Vehicles Symposium (IV2003), Jun. 2003, Columbus, OH.

"Multi-Sensor based Collision Warning System", Ka C. Cheok et al, Proc. of the 32nd ISATA, Vienna, Austria, Jun. 14-18, 1999.

\* cited by examiner

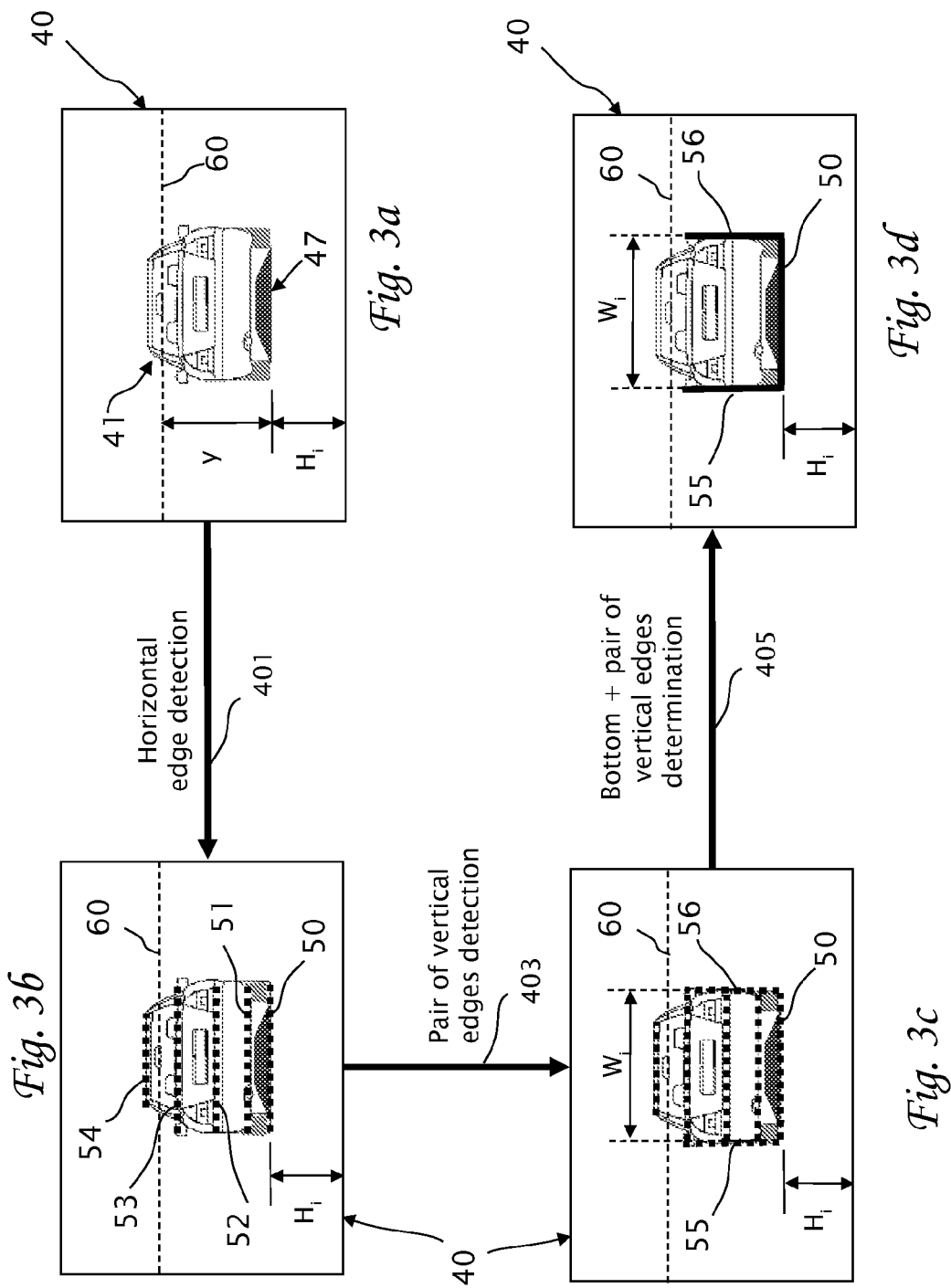

ESTIMATING DISTANCE TO AN OBJECT USING A SEQUENCE OF IMAGES RECORDED BY A MONOCULAR CAMERA

CROSS REFERENCE TO RELATED APPLICATIONS

The present application is a continuation application of U.S. patent application Ser. No. 11/554,048 filed by the same inventors on 30 Oct. 2006.

FIELD OF THE INVENTION

The present invention relates to a method for estimating distance to an obstacle from a moving automotive vehicle equipped with a monocular camera. Specifically, the method includes image processing techniques used to reduce errors in real time of the estimated distance.

BACKGROUND OF THE INVENTION AND PRIOR ART

Automotive accidents are a major cause of loss of life and property. It is estimated that over ten million people are involved in traffic accidents annually worldwide and that of this number, about three million people are severely injured and about four hundred thousand are killed. A report "The Economic Cost of Motor Vehicle Crashes 1994" by Lawrence J. Blincoe published by the United States National Highway Traffic Safety Administration estimates that motor vehicle crashes in the U.S. in 1994 caused about 5.2 million nonfatal injuries, 40,000 fatal injuries and generated a total economic cost of about $150 billion.

Lack of driver attention and tailgating are estimated to be causes of about 90% of driver related accidents. A system that would alert a driver to a potential crash and provide the driver with sufficient time to act would substantially moderate automotive accident rates. For example a 1992 study by Daimler-Benz indicates that if passenger car drivers have a 0.5 second additional warning time of an impending rear end collision about sixty percent of such collisions can be prevented. An extra second of warning time would lead to a reduction of about ninety percent of rear-end collisions.

There are numerous approaches for measuring the distance from a moving vehicle to the obstacle. One approach such as lidar uses emission of electromagnetic waves and detection of the waves scattered or reflected from the obstacle. The measured distance is a function of the time elapsed between emission and detection. This approach provides a good range measuring device but does not determine the type and shape of the target obstacle. An example of this approach is described in Samukawa et al., U.S. Pat. No. 6,903,680. Another example is U.S. Pat. No. 6,810,330 given to Matsuura, which describes a detector set on a motor vehicle, which emits a beam of light and receives a beam reflected from an object and determines the distance to the object.

Another known approach for measuring distance from a moving automotive vehicle to an obstacle uses stereoscopic imaging. The distance to the obstacle is determined from the parallax between two corresponding images of the same scene. A system which measures distance based on parallax requires two cameras well aligned with each other. An example of such a stereoscopic system is Ogawa U.S. Pat. No. 5,159,557.

A third approach for measuring the distance from a moving vehicle to an obstacle uses a single camera. Shimomura in U.S. Pat. No. 6,873,912 determines the range using triangulation by assuming the vehicle width is known or by using stereo or radar. Another disclosure using triangulation is U.S. Pat. No. 6,765,480 given to Tseng. Yet another disclosure using triangulation is U.S. Pat. No. 5,515,448 given to Katsuo Nishitane et al. in which the range from an object, i.e. the bottom of a vehicle is determined using optical flow variation. U.S. Pat. No. 5,515,448 discloses use of a look up table to convert pixel location on the image Y-axis.

A distance measurement from a camera image frame is described in "Vision-based ACC with a Single Camera: Bounds on Range and Range Rate Accuracy" by Stein et al., presented at the IEEE Intelligent Vehicles Symposium (IV2003), the disclosure of which is incorporated herein by reference for all purposes as if entirely set forth herein. Reference is now made to FIG. 1 (prior art). FIG. 1 is a schematic view of a road scene which shows a vehicle 10 having a distance measuring apparatus 30, including a camera 32 and a processing unit 34. Camera 32 has an optical axis 33 which is preferably calibrated to be generally parallel to the surface of road 20 and hence, assuming surface of road 20 is level, optical axis 33 points to the horizon. The horizon is shown as a line perpendicular to the plane of FIG. 1 shown at point 38 parallel to road 20 and located at a height $H_c$ of optical center 36 of camera 32 above road surface 20. During calibration, height $H_c$ of camera 32 is measured. Reference is now also made to FIG. 2 (prior art) which illustrates view of a road scene which shows vehicle 10 having distance measuring apparatus 30, operative to provide a distance Z measurement to an obstacle, e.g. second vehicle 11 or lead vehicle 11 in front of vehicle 10. illustrating vehicle 10 measuring distance to a leading vehicle 11 and FIG. 2a which illustrates an image frame 40 on image plane 31. (Image 40 is shown as non-inverted although image 40 is generally inverted in focal plane 31 An initial horizon image location 60 is obtained by a calibration procedure. A point P on the road at a distance Z in front of camera 32 will project to a height $y_p$ below horizon 60 in image coordinates in focal plane 31 of camera 32 at a given time t. The distance Z to point P on the road may be calculated, given the camera optic center 36 height $H_c$, camera focal length f and assuming a planar road surface:

$$Z(t) = -f \frac{H_c}{y_p} \quad (1)$$

The distance is measured, for example, to point P (in FIG. 1), which corresponds to the "bottom edge" of vehicle 11 at location 25 where a vertical plane, tangent to the back of lead vehicle 11 meets road surface 20.

Positioning range error $Z_e$ of the "bottom edge" of lead vehicle 11 in the calculation of Z in equation (1) is illustrated by rays 35 and 35'. Rays 35 and 35' project onto image plane 31 at respective image heights y and y'. Horizontal line 60 in image frame 40 is the projection of the horizon when road 20 is planar and horizontal. Horizontal line 60 is typically used as a reference for measuring images heights y and y'. Range error $Z_e$ is primarily caused by errors in locating the bottom edge 25 of lead vehicle 11, errors in locating the horizon 60 and deviations from the planar road assumption.

There is therefore a need for, and it would be highly advantageous to have, a method that can accurately measure the distance Z from a vehicle to an obstacle, e.g lead vehicle 11, a method which significantly reduces in real time the above-mentioned errors in distance measurement Z. This measurement can be used for warning a driver in time to prevent a collision with the obstacle as well as for other applications.

The Kalman filter is an efficient recursive filter which estimates the state of a dynamic system from a series of incomplete and noisy measurements. An example of an application would be to provide accurate continuously-updated information about the position and velocity of an object given only a sequence of observations about its position, each of which includes some error. The Kalman filter is a recursive estimator, meaning that only the estimated state from the previous time step and the current measurement are needed to compute the estimate for the current state. In contrast to batch estimation techniques, no history of observations and/or estimates is required. The Kalman filter is unusual in being purely a time domain filter; most filters (for example, a low-pass filter) are formulated in the frequency domain and then transformed back to the time domain for implementation. The Kalman filter has two distinct phases: Predict and Update. The predict phase uses the estimate from the previous timestep to produce an estimate of the current state. In the update phase, measurement information from the current timestep is used to refine this prediction to arrive at a new, more accurate estimate.

DEFINITIONS

The term "pitch angle" as used herein is the angle between the longitudinal axis (or optical axis) including the optic center 36 of camera 32 and the horizontal plane including the horizon 38.

The term "ego-motion" is used herein referring to "self motion" of a moving vehicle 10. Ego-motion computation is described in U.S. Pat. No. 6,704,621 to Stein et al, the disclosure of which is incorporated herein by reference for all purposes as if entirely set forth herein.

The terms "object" and "obstacle" are used herein interchangeably.

The term "following vehicle" is used herein to refer to vehicle 10 equipped with camera 32. When an obstacle of interest is another vehicle, e.g. vehicle 11 typically traveling in substantially the same direction, then the term "lead vehicle" or "leading vehicle" is used herein to refer to the obstacle. The term "back" of the obstacle is defined herein to refer to the end of the obstacle nearest to the following vehicle 10, typically the rear end of the lead vehicle, while both vehicles are traveling forward in the same direction. The term "back", in rear facing applications, means the front of the obstacle behind host vehicle 10.

The term "measuring a dimension of an object" as used herein is defined as measuring on an image of the object, as in an image frame of camera 32. The term "measuring a dimension of an object" generally includes relative measurements, such counting of picture elements in an image of the object or other relative units and does not require absolute measurements, for instance in millimeters on the object itself. The measurements of a dimension of an object are typically processed to produce the corresponding real or absolute dimension of the object, which then becomes the "smoothed measurement" of said dimension of the object.

The terms "upper", "lower", "below", "bottom", "top" and like terms as used herein are in the frame of reference of the object not in the frame of reference of the image. Although real images are typically inverted, the wheels of leading vehicle 11 in the imaged vehicle are considered to be at the bottom of the image of vehicle 11.

The term "bottom" or "bottom edge" are used herein interchangeably and refers to the image of the bottom of the obstacle, typically the image of "bottom" of the lead vehicle and is defined by the image of the intersection between a portion of a vertical plane tangent to the "back" of the lead vehicle with the road surface; hence the term "bottom" is defined herein as image of a line segment (at location 25) which is located on the road surface and is transverse to the direction of the road at the back of the obstacle. Alternatively, if we consider a normal projection 24 of the lead vehicle onto the road surface, then the "bottom edge" is the image of the end 25 of the projection 24 corresponding to the back of the lead vehicle 11.

The term "range" is used herein to refer to the instantaneous distance Z from the "bottom" of the obstacle to the front, e.g. front bumper, of following vehicle 10.

SUMMARY OF THE INVENTION

Various methods are provided monitoring headway to an object performable in a computerized system including a camera mounted in a moving vehicle. The camera acquires in real time multiple image frames including respectively multiple images of the object within a field of view of the camera. An edge is detected in the images of the object. Based on the edge detection, a smoothed measurement is performed of a dimension the edge. Range to the object is calculated in real time, based on the smoothed measurement.

According to the teachings of the present invention there is provided a method for collision warning in a computerized system including a camera mounted in a moving vehicle. The camera acquires consecutively in real time image frames including images of an object within the field of view of the camera. Range to the object from the moving vehicle is determined in real time. A dimension, e.g. a width, is measured in the respective images of two or more image frames, thereby producing an smoothed measurement of the dimension. The dimension is preferably a real dimension. (such as a width of a vehicle in meters). The dimension is measured subsequently in one or more subsequent frames. The range from the vehicle to the object is calculated in real time based on the smoothed measurement and the subsequent measurements. The processing preferably includes calculating recursively the smoothed dimension using a Kalman filter. The object is typically a second vehicle and the dimension is a width as measured in the images of the second vehicle or the object is a pedestrian and the dimension is a height of the pedestrian. The smoothed measurement is a smoothed width $W_v$, wherein the subsequent measurement is a width $w_i$, f is a focal length of the camera, and the range is Z calculated by:

$$Z = -f\frac{W_v}{w_i}.$$

The measurements of the dimension are preferably performed by: detecting one or more horizontal edges in each of the images; detecting two vertical edges generally located at or near the end points of the horizontal edges. The lower edge is then detected by detecting respective lower ends of the two vertical edges and the dimension is then a width measured between the lower ends. The detection of the horizontal edge is preferably performed by mapping grayscale levels of pixels in one or more image frames, thereby classifying each of the picture elements as either imaging a portion of a road surface or not imaging a portion of a road surface. The detections of the horizontal edge, the two vertical edges and the lower edge are performed at sub-pixel accuracy by processing over the two or more image frames. When the lower edge coincides with a portion of an image of a road surface, then the lower edge is a bottom edge. The height of the lower edge is determined based on one or more imaged features: an image of a shadow on a road surface and/or an image of self-illumination of the object on a road surface. Since the calculation of the range is generally dependent on an imaged height of the horizon, the imaged height of the horizon is preferably refined by one or more of the following techniques: (i) measuring the shape of the imaged road, (ii) detecting the vanishing point from the lane structure, lane markings, other horizontal lines and the like, (iii) detecting relative motion of imaged points and velocity of the moving vehicle, (iv) compensating for pitch angle variations of the camera, and (v) detecting ego motion of the camera.

According to the present invention there is provided a computerized system including a camera mounted in a moving vehicle. The camera acquires consecutively in real time image frames including respectively images of an object within a field of view of the camera. The system determines in real time a range from the moving vehicle to the object. A measurement mechanism measures in two or more image frames a dimension in the respective images of the object and a series of two or more measurements of the dimension is produced. A processor processes the two or more measurements and a smoothed measurement of the dimension is produced. The measurement mechanism measures the dimension of one or more of the image frames subsequent to the two or more image frames, and one or more subsequent measurements of the dimension is produced.
The processor calculates the range in real time based on the smoothed measurement and the one or more subsequent measurements. The object is typically a pedestrian, a motorcycle, an automotive vehicle, an animal and/or a bicycle. The measurement mechanism performs sub-pixel measurements on the image frames.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are given by way of illustration and example only and thus not limitative of the present invention:

FIGS. 3a-3d schematically illustrate image processing frames used to accurately measure distance to the "lead" vehicle, in accordance with embodiments of the present invention;

DESCRIPTION OF THE PREFERRED EMBODIMENTS

Figure 1:
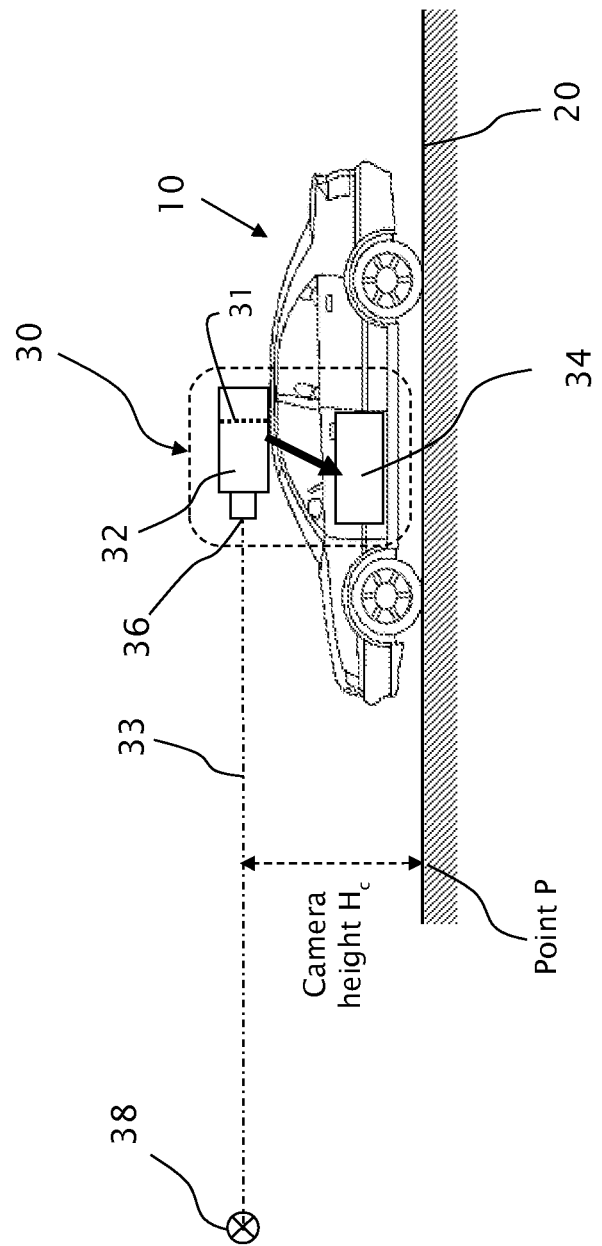
FIG. 1 (prior art) illustrates a vehicle with distance measuring apparatus, including a camera and a computer useful for practicing embodiments of the present invention.

The present disclosure is of a system and method of processing image frames of an obstacle as viewed in real time from a camera mounted in a vehicle. Specifically, the system and method processes images of the obstacle to obtain an obstacle dimension, typically an actual width of the obstacle which does not vary in time. The range to the object in each frame is then computed using the instantaneous measured image width (in pixels) in the frame and the smoothed physical width of the object (e.g. in meters). A smoothed width of the obstacle is preferably determined recursively over a number of frames using, for example, a Kalman filter. The range to the obstacle is then determined by comparing the instantaneous measured width in each frame to the smoothed width of the obstacle. Various embodiments of the present invention optionally include other refinements which improve the range measurement, particularly by reducing error in the range estimation due to changes in the pitch angle of the camera, e.g. slope of road surface 20, and multiple methods of locating the horizon position from frame to frame.

The principles and operation of a system and method for obtaining an accurate range to an obstacle, according to features of the present invention, may be better understood with reference to the drawings and the accompanying description.

It should be noted, that although the discussion herein relates to a forward moving vehicle 10 equipped with camera 32 pointing forward in the direction of motion to lead vehicle 11 also moving forward, the present invention in a different embodiment may, by non-limiting example, alternatively be configured as well using camera 32 pointing backward toward a following vehicle 11 and equivalently measure the range therefrom. The present invention in different embodiments may be similarly configured to measure range to oncoming obstacles such as vehicle 11 traveling towards vehicle 10. All such configurations are considered equivalent and within the scope of the present invention.

Before explaining embodiments of the invention in detail, it is to be understood that the invention is not limited in its application to the details of construction and the arrangement of the components set forth in the following description or illustrated in the drawings.

Embodiments of the present invention are preferably implemented using instrumentation well known in the art of image capture and processing, typically including an image capturing device, e.g camera 32 and an image processor 34, capable of buffering and processing images in real time. Moreover, according to actual instrumentation and equipment of embodiments of the method and system of the present invention, several selected steps could be implemented by hardware, firmware or by software on any operating system or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a processor, such as a computing platform for executing a plurality of instructions.

Unless otherwise defined, all technical and scientific terms used herein have the same meaning as commonly understood by one of ordinary skill in the art to which this invention belongs. The methods, and examples provided herein are illustrative only and not intended to be limiting.

By way of introduction, principal intentions of the present invention are: (1) to provide a preferably recursive algorithm over multiple frames to refine the range measurement to the obstacle; (2) to provide accurate determination of the "bottom edge" of a target vehicle or other obstacle and tracking of the "bottom edge" over multiple image frames and (3) to provide a mechanism to reduce pitch error of the camera, e.g. error due to road surface, and other errors in estimating the location of the horizon.

The present invention, in some embodiments, may use a mechanism which determines the pitch angle of camera 32. The pitch error determination mechanism may be of any such mechanisms known in the art such as based on the images themselves or based on gravity sensors, e.g. plumb line or inertial sensors.

It should be further noted that the principles of the present invention are applicable in Collision Warning Systems, such as Forward Collision Warning (FCW) systems based on scale change computations, and other applications such as headway monitoring and Adaptive Cruise Control (ACC) which require knowing the actual distance to the vehicle ahead. Another application is Lane Change Assist (LCA), where camera 32 is attached to or integrated into the side mirror, facing backwards. In the LCA application, a following vehicle is detected when entering a zone at specific distance (e.g. 17 meters), and thus a decision is made if it is safe to change lanes.

Reference is now made to FIG. 3a-d, which illustrate processing of an image frame 40 formed on image plane 31 of camera 32, according to an embodiment of the present invention. Image frame 40 includes an image 41 of vehicle 11. Image 47 of shadow 23, as cast by vehicle 11 on road surface 20, starts at row $H_i$ of image frame 40. Item 47 is different at night time: during daytime item 47 is often the shadow or simply a darker region below leading vehicle 11. At night item 47 might be a light line where the road illuminated by leading vehicle 11 headlights is visible under leading vehicle 11.

Step 401 in the image processing method, according to the present invention includes horizontal edge detection. An image processing unit, according to embodiments of the present invention, determines, for example, horizontal edge 50 of bottom 50, underside edge of bumper 51, top edge of bumper 52, bottom edge of window 53 and roof edge 54, as illustrated in FIG. 3b. In step 403, vertical edges 55 and 56 of vehicle 11 sides are detected, as illustrated in FIG. 3c preferably based on the endpoints of horizontal features 50, 51, 52, 53 and/or 54. Further processing in step 405 of image frame 40 yields information needed to calculate the range Z of vehicle 11 from vehicle 10, specifically bottom edge 50 and vertical edges 55 and 56 are determined, as shown in FIG. 3d. Bottom edge 50 best represents location 25 where a vertical plane, tangent to the back of lead vehicle 11 meets road surface 20. Imprecise positioning of bottom edge 50 results in error $Z_e$ in calculating distance Z. Thus, in accordance with an embodiment of the present invention, in order to determine the "range" at a given time t, the image data is processed to determine the height (y position relative to horizon 60) of bottom edge 50 in each image frame 40. Error $Z_e$ is derived primarily from errors in image position y which in turn come from errors in locating bottom edge 50 of imaged vehicle 41 in each image frame 40, errors in locating horizon projection 60 and deviations from the planar road assumption of road surface 20. According to different embodiments of the present invention, these errors are minimized by: (a) multiple frame estimation of distance Z; and (b) refinement of locations of bottom 50 and horizon 60.

Multiple Frame Estimate of Distance Z

Since the scene changes dynamically and range Z changes continuously over time, it does not make sense to reduce error $Z_e$ by averaging Z over time or otherwise directly "smoothing" the distance Z. A key step, according to an embodiment of the present invention, is to estimate a width $W_v$ of an obstacle such as lead vehicle 11, which remains constant over time. Image data related to width $W_v$, is "smoothed" in time, preferably using a Kalman filter thereby processing the non-linear data and reducing random errors or "noise" in image frames 40. Smoothed width $W_v$ is then used to refine the distance Z estimation.

An aspect of the present invention is to determine smoothed width $W_v$ of vehicle 11. Each of image frames 40 is processed to determine image positions for bottom horizontal edge 50. Two vertical edges 55 and 56 extending upwards from each end of bottom edge 50 and the imaged width $w_i$ between two vertical edges 55 and 56 are used to derive actual width W(t) of vehicle 11.

The single frame measurement of width W(t) is given by:

$$W(t) = w_i(t)\frac{H_c}{y(t)} \qquad (2)$$

or $$\frac{W(t)}{w_i(t)} = \frac{H_c}{y(t)} \qquad (3)$$

where $w_i$ is the width of the image of vehicle 11, typically represented by the difference in pixels between vertical edges 55 and 56 multiplied by the width of the pixels. The smoothed vehicle width $W_v$ is obtained by recursively applying equation (2) over multiple frames preferably using a Kalman filter. The parameters of the Kalman filter are adjusted so that initially the convergence is fast and then, after tracking the target vehicle 11 for a while, e.g. a few seconds, only very slow changes in the smoothed width $W_v$ estimate are allowed. Given the smoothed vehicle width $W_v$ and the width in the image $w_i$ in a subsequent image frame 40, we can then compute the corrected range Z:

$$W_v(t_n) = F([w_i(t_j) | 0 = j = n]) \qquad (4a)$$

$$Z = -f\frac{W_v}{w_i} \qquad (4b)$$

Figure 4:
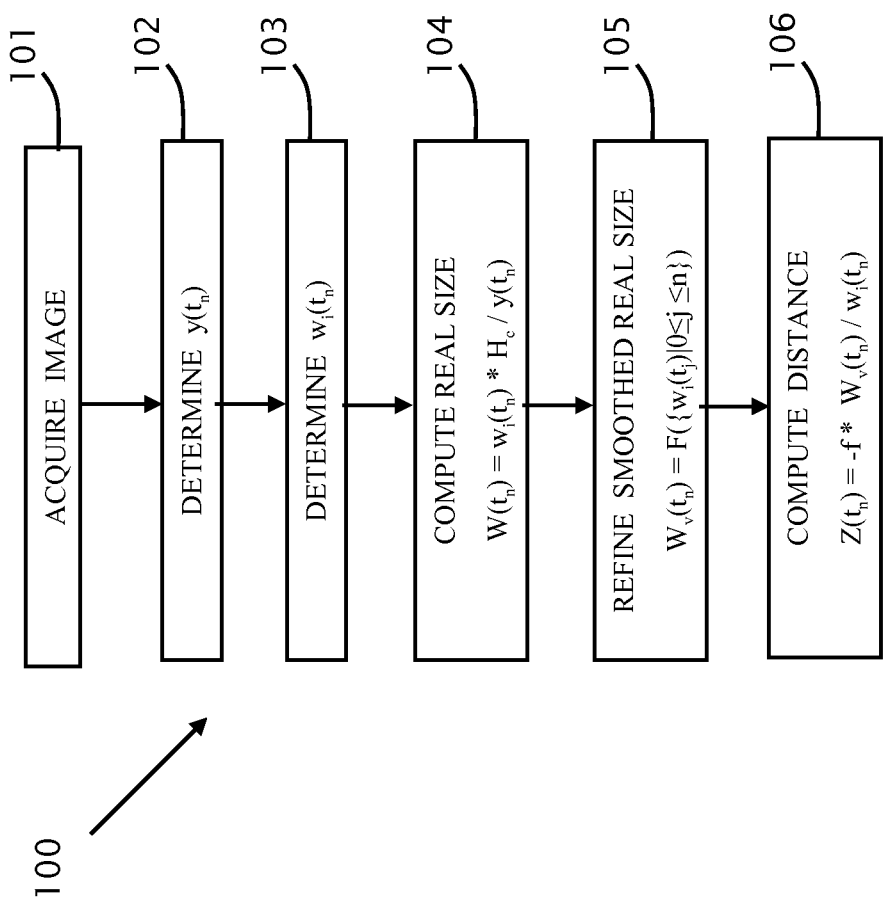
FIG. 4 is flow diagram which illustrates an algorithm for determining distance, in accordance with embodiments of the present invention.

FIG. 4 is a flow diagram which illustrates and exemplifies an algorithm 100 that distance measuring apparatus 30 uses to determine the distance Z, in accordance with embodiments of the present invention. In step 101, camera 32 acquires an image at time $t_n$. In step 102, processor 34 determines a value for the y position in image coordinates, relative to horizon 60, of bottom edge 50. In step 103 a value for the $w_i(t_n)$ of image lead vehicle 11 width. In step 104 a "sample" real size $W(t_n)$ of the width of target vehicle 11 is determined from $w_i(t_n)$ in accordance with equation (2). In step 105 a "smoothed width" $W_v(t_n)$ is determined as a function F, optionally of the n sample real sizes $W(t_n)$ determined for the (n+1) images in the sequence of images acquired by camera 32 in accordance with an expression shown in equation (4a). F represents any suitable function of the set of values $W(t_j)$ determined for the (n+1) images acquired at times $t_j$ for $0 \leq j \leq n$.). In step 106 a "smoothed distance" $Z(t_n)$ is determined in accordance with an expression shown in equation (4b).

In a typical scenario, an image frame 40 of the vehicle 11 is acquired at a large distance Z and hence its dimensions in image frame 40 are small. This implies that both y and $w_i$ estimates contain large errors. As vehicle 11 gets closer and its corresponding image 41 grows larger, we obtain more accurate estimates of these parameters.

Thus the measurement noise (R) and process noise (Q) matrices of the Kalman filter are both time dependent and image size dependent.

$$R(t) = R(0) + \alpha * t \quad (5)$$

$$Q(t) = \beta * w + \chi * \max(0, T_{max} - t) \quad (6)$$

Where t is the age of the object, $T_{max}$ is a parameter defining the age at which we expect the width to have converged (values of $T_{max}$ of 10-30 typically work well) and alpha ($\alpha$), beta ($\beta$) and gamma ($\chi$) are parameters tuned empirically from acquired data. Then in an embodiment of the present invention, the classic Kalman correction/prediction iteration is used:
Correction:

$$K = \frac{P}{R+Q} \quad (7)$$

$$x = x + K * (z - x) \quad (8)$$

$$P = (1 - K) * P \quad (9)$$

Prediction:

$$P = P + Q \quad (10)$$

Where P is the state covariance, z is the measurement (in our case W(t)) from equation (2) and x is the state (in our case the smoothed width $W_v$).

In equations (7)-(10) operator "=" represents an assignment (as in computer language C), not an equality, for instance in equation (10) the value of P is replaced with P+Q. First equation (7) is applied which computes the Kalman gain K. Then equations (8) and (9) are applied in either order to update state x. Then equation (10) is applied to update P.

Refinement of Location of Bottom Edge

As described above, much of the errors in estimating W(t) using eq. (2) come from errors in locating the bottom 50 of vehicle 11. Thus, according to the present invention, a few refining measurements are taken to get a more accurate estimation of location of bottom 50 of vehicle 11.

In order to get good measurements of y from projection 60 of horizon to a horizontal feature (e.g. bottom 50), the horizontal feature needs to be accurately identified in each image frame 40. For instance bottom 50 can be represented by the perceived points of contact between vehicle 11 and road surface 20 at location 25 or better by corresponding edge of shadow 47 of vehicle 11 and road surface 20 at location 25 when the sun is positioned right above vehicle 11. It should be noted that the sun does not need to be right above. Even if the angle were to be 45 degrees the error in range would only be equal to the distance between the bottom of vehicle 11 and the road surface 20 (typically 30-40 cm). At every frame 40, a single frame estimate of the points of contact is obtained along with a confidence measure associated with the estimate. The single frame estimate and confidence measure are used for locating bottom 50 and the location is preferably adjusted using a non-linear smoothing filter. In order to estimate the location of bottom 50, a preliminary refinement is optionally performed on a single frame 40, according to embodiments of the present invention. Pixels are classified or mapped as belonging to road surface 20 or not belonging to road surface 20, preferably using pixel grayscale values I and gradients $(I_x, I_y)$ in image coordinates. The image of the area on road surface 20 in immediate vicinity of vehicle 11 is used to derive the typical values of I and gradients $(I_x, I_y)$ for road surface 20 provided that the area is clear of other objects such as other vehicles. In single frame 40, a horizontal edge in the pixel mapping, in proximity to the estimate of bottom 50 of vehicle 11 in the previous frame, is the new single frame estimate of bottom 50.

Optionally, a second refinement step is also performed on a single frame 40. Typically, under vehicle 11 during the day there is a dark patch 47, such as a sun shadow, or a light patch at night caused by self illumination near vehicle 11. Other features discernible at night include a horizontal line 52 indicating the bumper of vehicle 11 and/or spots of light from lamps or reflections. Dark wheels are also optionally used to determine location of image 41. These and other discernible features are combined into a confidence score.

Optionally, a third refinement step is performed using multiple frames 40. In order to avoid jumps in image location of bottom 50 from frame 40 to frame 40 of the location of bottom edge 50 in response to every mark or shadow on the road, the location of bottom 50 must be consistent with previous frames 40, with camera 32 pitch angle, and with changes in scale of target vehicle image 41.

These three steps can be combined, by way of example, into the following algorithm: Vertical edges 55, 56 and bottom edge 50 represent a rectangular region which is the current best estimate of the location of vehicle image 41 in image frame 40. The rectangular region typically extends between the middle row of the vehicle image 41, such as an imaged row of the hood of vehicle 11, and the bottom valid row of the image 41. For each column in the rectangular region, absolute values of horizontal component $I_x$ are summed of the gradient of grayscale. Any column with a sum above a threshold $T_1$ is excluded from further processing as well as neighboring columns to the left and right of the excluded column. If more than 50% of the columns are excluded in a single image frame 40, the image frame 40 is discarded as being of poor quality due to shadows or other image artifacts. For the non-excluded columns of image frame 40, the gray scale image values I are summed along the rows, thereby producing a single column of summed gray scale values. The single column or vector is differentiated looking for significant local maxima in absolute value. Typically, the local maxima are found at sub-pixel resolution. In daytime, bottom 50 of the vehicle image 41 is expected to be darker (shadow 47) than road 20. Thus to each peak representing a dark above light transition, a factor $F_1$ is added. At night-time, on more distant vehicles 11, there is a bright line which is a patch of road illuminated by headlights of vehicle 11 and visible under vehicle 11. Therefore a factor $F_2$ is added at night for light above dark transitions. Both during day and night, bottom edge 50 is terminated by the wheels of vehicle 11. A factor $F_3$ is added for peaks which come from lines which terminate symmetrically inwards of the vehicle edge. In order to insure consistency between different frames 40, the absolute values of the modified column (or vector) are multiplied by a Gaussian function centered around the expected location of bottom 50 derived from the tracking of vehicle 11 and pitch angle estimate of camera 32. The Gaussian function preferably has a half width (sigma) which is an inverse function of the tracking confidence. The largest peak in the column vector is selected that is above a threshold $T_2$ and the sub-pixel location of the peak is selected as the new location of vehicle bottom 50.

Refinement of Location of Horizon

Figure 5:
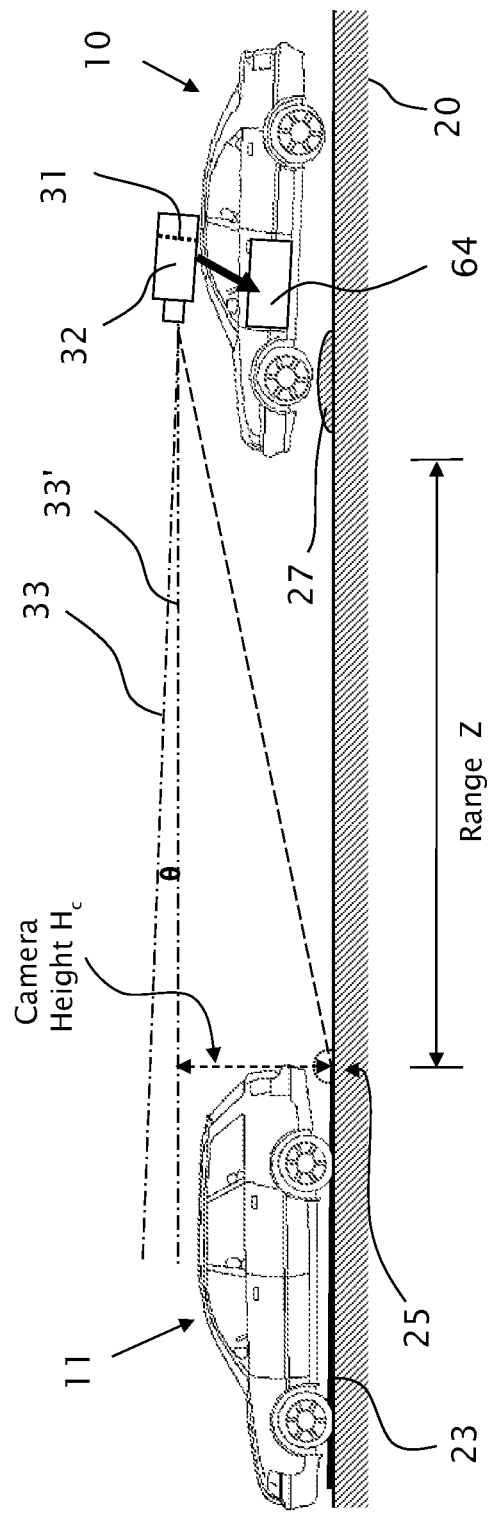
FIG. 5 schematically illustrates a pitch angle error in the system of FIG. 1, which is compensated for using embodiments of the present invention.
Figure 6:
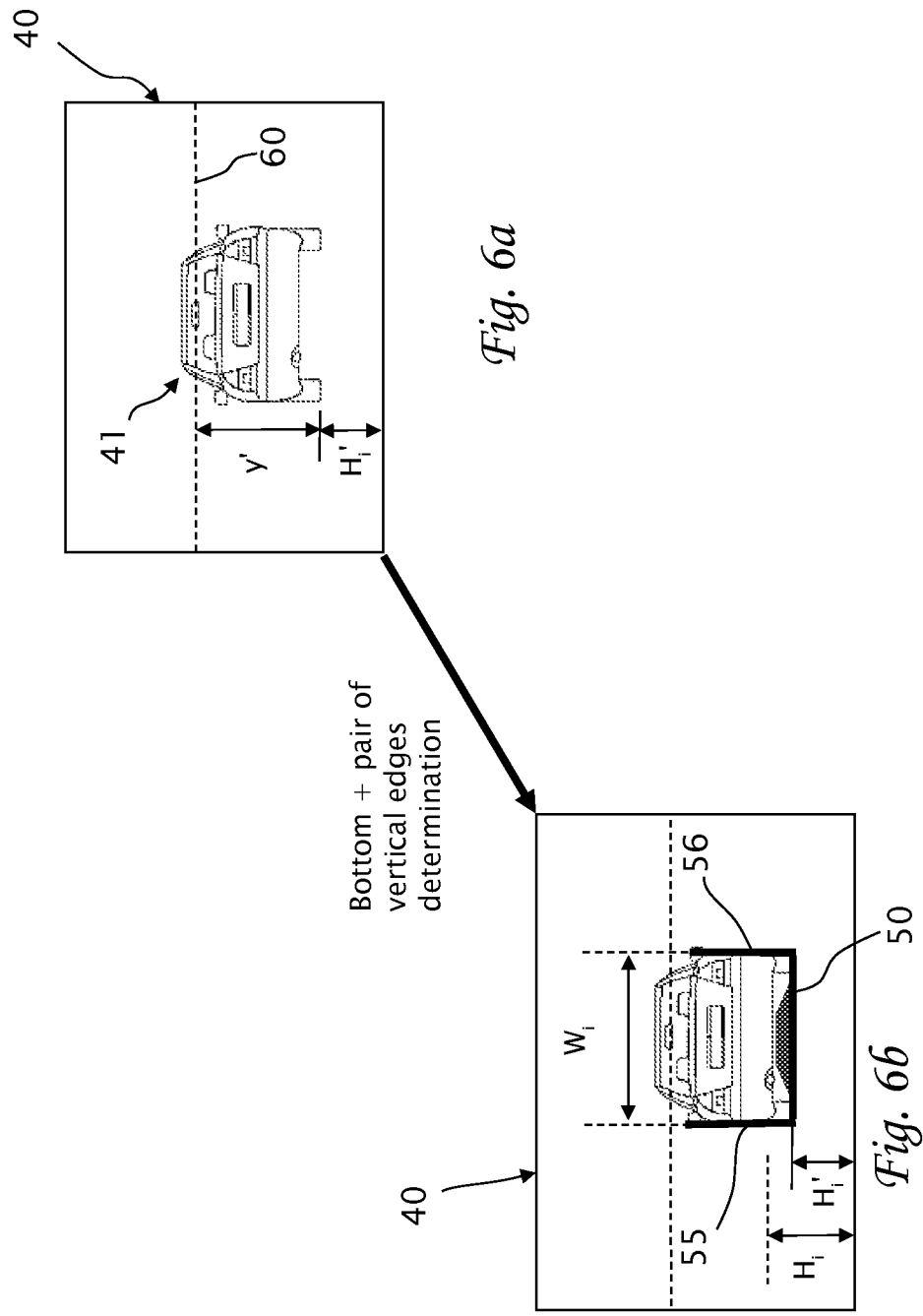
FIGS. 6a and 6b schematically illustrate compensation of the pitch angle error as illustrated in FIG. 5, and the compensation is performed, according to embodiments of the present invention.

Another contribution to the above-mentioned errors in estimating distance W(t) using eq. (2) comes from errors in locating horizon 60. Thus, according to embodiments of the present invention, refinements are performed to acquire an accurate estimate of the location of the horizon 60. The initial horizon location 60 is obtained by the calibration procedure when the system is installed. Horizon refinement is based, among other things, on tracking the horizon (pitch/yaw), ego motion of vehicle 10 and on detecting the vanishing point and shape of the road lanes. Road lane shape also gives an indication as to the planarity of the road. A system known in the art for detecting the road lanes and their vanishing point is assumed. Such a system is described in is described in now allowed U.S. patent application Ser. No. 09/834,736 (US patent publication 2003/0040864) to Stein et al, the disclosure of which is incorporated herein by reference for all purposes as if entirely set forth herein. Horizon 60 is derived from the ordinate $y_p$ in image coordinates of the vanishing point. A pitch angle θ estimation system, based for instance on image measurements and/or an inertial sensor as known in the art is assumed. FIG. 5 depicts a scene where vehicle 10 encounters a bump 27 which causes a change in of the optical axis 33', from parallel to road surface 25 to angle 33. Vehicle 10 is equipped with a camera 32 and an image processing system 64, according to embodiments of the present invention. Reference is now made to FIGS. 6a and 6b which illustrate compensation of pitch error (of FIG. 5) in image 40. Bottom 50 is shown in FIG. 6a at time t−1 at position y' from horizon position 60 and at row $H_i'$ from the image bottom. In FIG. 6b, at time t upon compensation for the pitch error, bottom 50 is shown also at $H_i'$ instead of "would-be" row $H_i$ without compensation for the pitch error. The location 60 of the horizon is not effected by change in scale but by the pitch error. It can be derived from the images or by an inertial sensor as known in the art.

After eliminating the vehicle pitch, another estimate of the horizon ($y_m$) can be given by an equation representing the relation of the motion of image points on the road, for example $A(x_1,y_1)$ and $B(x_2,y_2)$, and vehicle speed:

$$y_1 - y_m = f \frac{H_c}{Z_1} \tag{11}$$

$$y_2 - y_m = f \frac{H_c}{Z_2} \tag{12}$$

Therefore:

$$Z_1 = f \frac{H_c}{y_1 - y_m} \tag{13}$$

$$Z_2 = f \frac{H_c}{y_2 - y_m} \tag{14}$$

The vehicle motion ($d_Z = Z_1 - Z_2$) is known from the vehicle speed. We then write the equation:

$$d_Z = f \frac{H_c}{y_1 - y_m} - f \frac{H_c}{y_2 - y_m} \tag{15}$$

which can be solved for $y_m$, which is the newly estimated horizon location.

The horizon 60 estimates from different calculations can be combined using least squares. Horizon estimate $y_0$ is calculated from the initial calibration, $y_p$ is calculated from tracking lane marking of the road and determining the vanishing point, $y_m$ is calculated from the relative motion of image points on the road 20, $d_y$ denotes the interframe pitch change and $y_{-1}$ is a calculation based on pitch angle measurement or estimation. Horizon (y) is preferably calculated to minimize the error (E) as follows:

$$E = L_1(y-y_0)^2 + L_2(y-y_p)^2 + L_3(y-y_m)^2 + L_4(y-(y_{-1}+d_y))^2 \tag{16}$$

Where the factor $L_1$ is constant, $L_2$ depends on the confidence of the lane detection, $L_3$ depends on the number of road points tracked and the confidence of the tracking and $L_4$ depends on the confidence of the pitch estimation. Using least squares normalization means that the solution for (y) can be found using linear methods. The least squares (or $\mathcal{L}2$ norm) can be replaced by the $\mathcal{L}_1$ norm L1-L4 in equation 16 or any other metric and solved numerically using standard non-linear optimization. Some, usually large, changes in horizon location 60 can indicate a bumpy road in which case the confidence on the y estimate is reduced.

Figures 2, 2A:
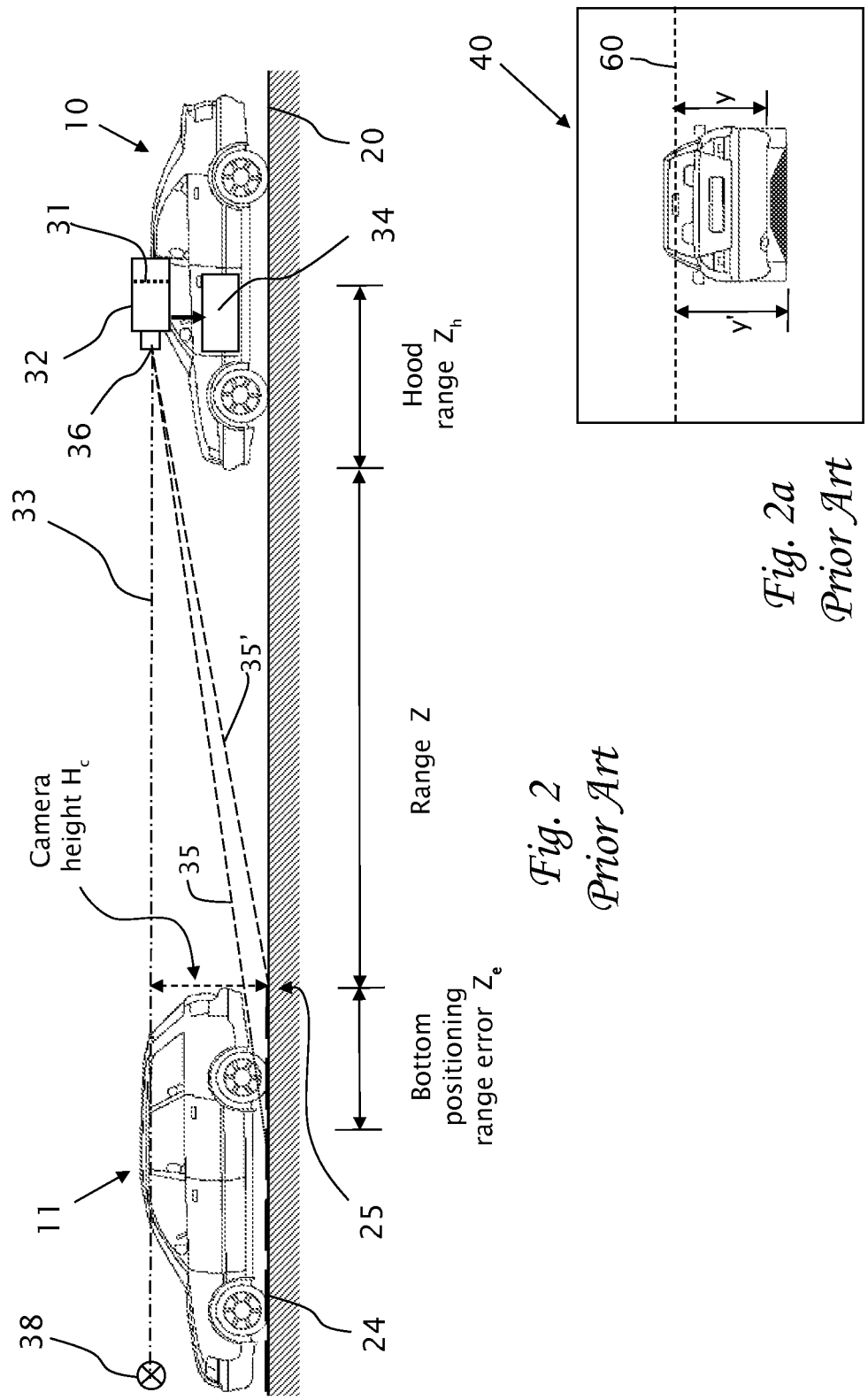
FIG. 2 (prior art) further shows the vehicle of FIG. 1 having a distance measuring apparatus, operative to provide a distance measurement to a leading vehicle; wherein measurement errors of distance Z are illustrated as known in the prior art.
FIG. 2a (prior art) is a view of an image on an image plan of camera 32.

Referring back to FIG. 2, the distance $Z_h$ between the camera image plane 31 to the front bumper of vehicle 10 is subtracted from the computed range Z from image plane 31 to lead vehicle 11, as we want to measure the distance from the front bumper of vehicle 10 to the obstacle and not from the actual positioning of image plane 31 in vehicle 10.

It should be noted that not only the width of the lead vehicle 11 remains constant over time but also other dimensions such as height or distances between various pairs of horizontal edges such as roof edge 54, the bottom of the rear window 53 the top of the bumper 52 or bottom of bumper 51. Then we can estimate the lead vehicle 11 smoothed selected vertical feature $H_v$, which remains constant over time, preferably using the Kalman filter to process the non-linear data and reduce influences of noise in the frames 40. It is also possible to use more then one smoothed constant dimension of the lead vehicle 11, such as its width, height etc, to refine the estimation of range Z to said lead vehicle 11.

To summarize, determining the bottom location 50, the horizon location 60 and integration of information over time are essential for the accurate measurement of the distance Z of a vehicle 10 from a target vehicle 11 or obstacle in front or in the back of it.

Figure 7:
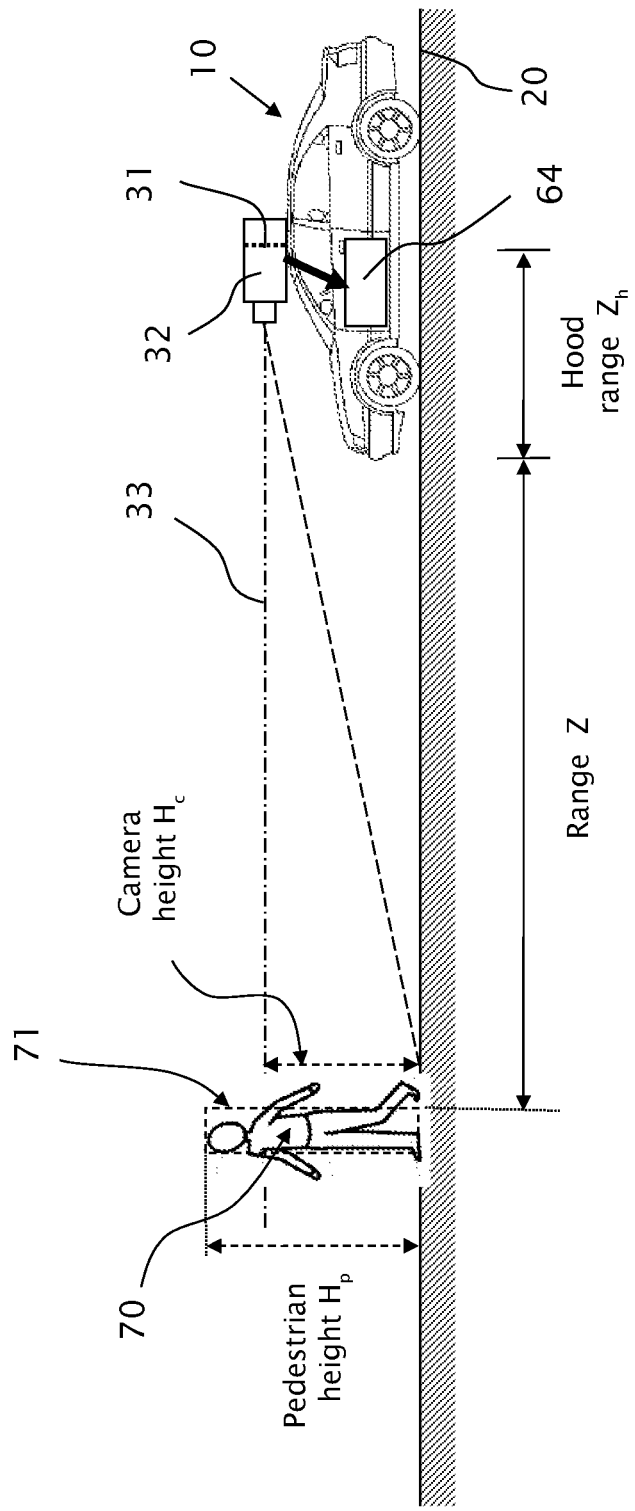
FIG. 7 schematically illustrates an accurate distance measurement to a pedestrian in front of a vehicle, as performed in accordance with an embodiment of the present invention.

In another embodiment of the present invention, a range Z from the host vehicle 10 to another object such as a pedestrian 70. Referring to FIG. 7, a pedestrian 70 width, as viewed by a camera 32, is dynamic, and may change considerably for instance as pedestrian turns around, but height Hp remains generally constant over time. Rectangle 71 represents the pedestrian 70 body changes in width as the pedestrian 70 moves, but rectangle 71 height remains generally constant over time. Hence, the estimated range Z can be refined using said pedestrian 70 smoothed height $H_s$, which remains generally constant over time, preferably using the Kalman filter to process the non-linear data and reduce influences of noise in the frames 40.

The invention being thus described in terms of several embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for monitoring headway to an object, the method performable in a computerized system including a camera mounted in a moving vehicle, wherein a processor acquires in real time a plurality of image frames including respectively a plurality of images of the object within a field of view of the camera, the method comprising the steps of:
    tracking over time thereby detecting in at least two image frames at least one edge in the respective images of the object;
    based on said detecting, computing a smoothed dimension of the object by smoothing in time a measurement of said at least one edge over the respective images of the object; and
    calculating range to the object in real time by comparing an instantaneous measured dimension of the object to said smoothed measurement of the object.

2. The method, according to claim 1, wherein said detecting is performed at sub-pixel accuracy.

3. The method, according to claim 1, wherein the range is determined solely from information derived from the images.

4. The method, according to claim 1, wherein said dimension is a real dimension of said object.

5. The method, according to claim 1, wherein said calculating includes calculating recursively said dimension using a Kalman filter.

6. The method, according to claim 1, wherein the object is a second vehicle and wherein said dimension is a width as measured in images of said second vehicle.

7. The method, according to claim 1, wherein the object is a pedestrian and wherein said dimension is a height of said pedestrian.

8. The method, according to claim 1, further comprising:
    detecting at least one horizontal edge in each of said images;
    detecting two vertical edges based on end points of said at least one horizontal edge; and
    detecting a lower edge, by detecting respective lower ends of said two vertical edges, wherein said dimension is a width measured between said lower ends.

9. The method, according to claim 8, wherein said detecting horizontal edge is performed by mapping grayscale levels of a plurality of pixels in at least one of said image frames, thereby classifying each of said picture elements as imaging a portion of a road surface or not imaging a portion of a road surface.

10. The method, according to claim 8, wherein said lower edge coincides with a portion of an image of a road surface, whereby said lower edge is a bottom edge.

11. The method, according to claim 8, wherein a height of said lower edge is determined based on at least one imaged feature selected from the group consisting of: an image of a shadow on a road surface and an image of self-illumination of the object on a road surface.

12. The method, according to claim 1, whereby said calculating the range is dependent on an imaged height of the horizon, further comprising the step of: locating said imaged height of the horizon.

13. The method, according to claim 12, wherein said locating is refined by at least one technique selected from the group consisting of:
    (i) measuring the shape of the imaged road,
    (ii) detecting the vanishing point from at least one road marking selected from the group consisting of: lane structure, lane marking, and horizontal line marking;
    (iii) detecting relative motion of imaged points and velocity of the moving vehicle,
    (iv) compensating for pitch angle variations of the camera, and
    (v) detecting ego motion of the camera.

14. A computerized system including a camera mountable in a moving vehicle, wherein the camera acquires in real time a plurality of image frames including respectively a plurality of images of an object within a field of view of the camera, wherein the computerized system performs the method steps of claim 1.

15. A computerized system including a camera mountable in a moving vehicle, wherein the camera acquires in real time a plurality of image frames including respectively a plurality of images of an object within a field of view of the camera, wherein the system is configured to monitor headway in real time to the object, the system comprising:
    a detection mechanism adapted to track over time for detection of at least one edge in respective images of the object in at least two of the image frames; and
    a processor adapted to: (i) compute a smoothed dimension of the object based on said detection by smoothing in time a measurement of said at least one edge over the respective images of the object, and (ii) calculate range to the object in real time by an instantaneous measured dimension of the object compared to said smoothed measurement of the object.

16. The computerized system, according to claim 15, wherein said object is selected from the group consisting of: pedestrian, motorcycle, automotive vehicle, animal and bicycle.

17. The computerized system, according to claim 15, wherein said measurement mechanism is adapted to perform sub-pixel measurements on said image frames.

18. A method for monitoring headway to an object, the method performable in a computerized system including a camera mounted in a moving vehicle, wherein the camera acquires an image frame including an image of the object within a field of view of the camera, the method comprising
    detecting a horizontal edge of the image of the object to sub-pixel accuracy by classifying the picture elements in the image frame as either imaging a portion of a road surface or not imaging a portion of a road surface;
    locating in the image frame an imaged height of the horizon; and
    determining said headway from the vertical position of said horizontal edge relative to the imaged height of the horizon.

* * * * *